Figure 1:
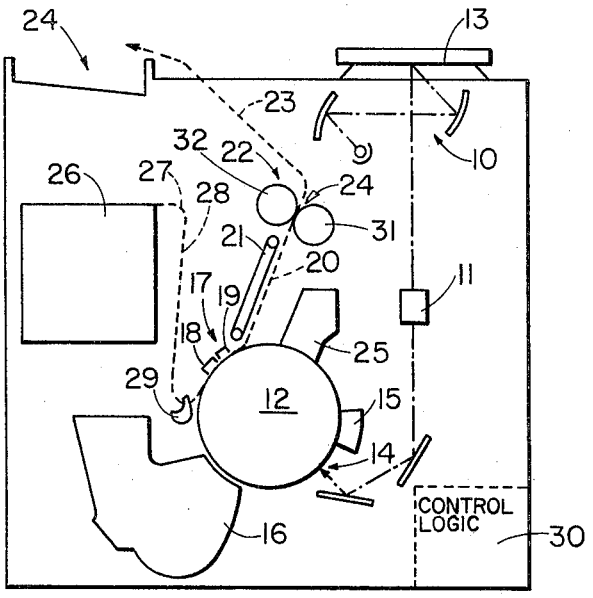
Figure 2:
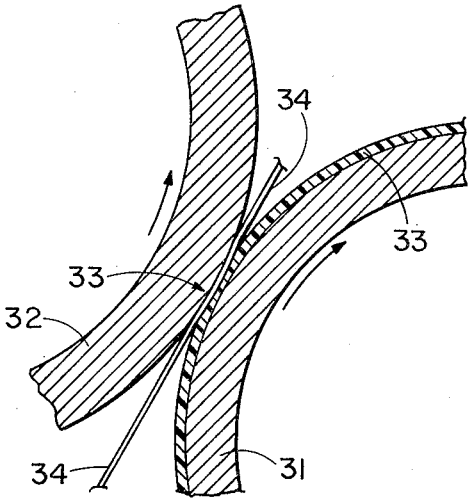
Figure 3:
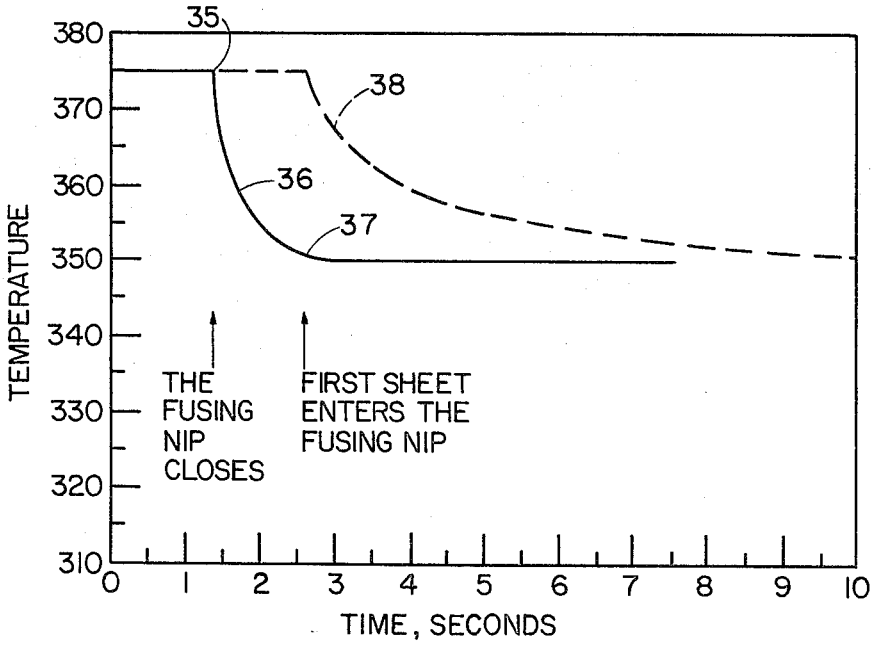

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 15

T947,012
DRY HOT ROLL FUSER HAVING EARLY FUSING NIP CLOSURE

Fred Y. Brandon and Jerrold F. Zimmer, Boulder, Colo., assignors to International Business Machines Corporation, Armonk, N.Y.

Filed Apr. 28, 1975, Ser. No. 572,374
Int. Cl. G03g *15/00;* H05b *1/00*
U.S. Cl. 219—216
1 Sheet Drawing. 14 Pages Specification

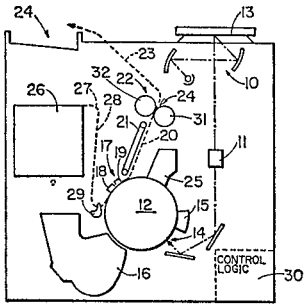

A dry release hot roll fuser wherein the hot roll is internally heated, the surface of the hot roll is deformable, and a rigid backup roll is force biased into the hot roll to form an axial depression in the hot roll, which depression comprises the fusing nip. The fusing nip is closed prior to the arrival of a sheet to be fused. The early closing time interval is such as to cause the hot roll to complete at least one revolution against the cooler backup roll, prior to arrival of the first sheet to be fused.

In the standby mode, the fusing nip is open, and the hot roll temperature is controlled to be at a temperature higher than the desired fusing temperature. This higher temperature is desirable since it is known that the thick deformable surface on the hot roll will cause the fusing temperature to drop during fusing. Since the hot roll's surface is relatively thick, and formed of a heat insulator, such as silicone rubber, the drop which occurs is a result of the cooling effect of the first sheets to be fused.

After the early closing interval, the hot roll's fusing temperature has dropped to the vicinity of the optimum fusing temperature and the automatic temperature control system thereafter supplies just enough additional internal heat energy to offset the cooling effect of the sheets. The probability of the first sheet sticking to the hot roll has been reduced as a result of this roll early closing.

To accommodate the high standby temperature, the fusing nip is closed early—i.e. before a sheet arrives at the fusing nip. The time period of this early closure is critical, and has been found to be such as will produce at least one revolution of the hot roll prior to the arrival of a sheet to be fused. It has been found that this early closing of the fusing nip causes a rapid drop in the fusing nip temperature to approximately the optimum fusing temperature prior to arrival of the first sheet to be fused, and thereafter the temperature control system maintains the optimum temperature. Thus, wrap of the sheets about the hot roll is minimized.

DRY HOT ROLL FUSER HAVING EARLY FUSING NIP CLOSURE

Original Filed April 28, 1975